United States Patent
Abouzid et al.

(10) Patent No.: US 8,843,174 B2
(45) Date of Patent: Sep. 23, 2014

(54) INDOOR CELLULAR NETWORK WITH POSITION INFORMATION OF A MOBILE DEVICE

(75) Inventors: Taoufiq Abouzid, Riyadh (SA); Said Soulhi, Saint Constant (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/521,778

(22) PCT Filed: Feb. 1, 2010

(86) PCT No.: PCT/EP2010/051193
§ 371 (c)(1),
(2), (4) Date: Aug. 30, 2012

(87) PCT Pub. No.: WO2011/091859
PCT Pub. Date: Aug. 4, 2011

(65) Prior Publication Data
US 2012/0322501 A1 Dec. 20, 2012

(51) Int. Cl.
*H04M 1/00* (2006.01)
*G01S 5/02* (2010.01)
*H04W 64/00* (2009.01)
*G01S 13/87* (2006.01)

(52) U.S. Cl.
CPC ............... *H04W 64/00* (2013.01); *G01S 5/02* (2013.01); *G01S 13/876* (2013.01); *G01S 5/0236* (2013.01)
USPC ..................... 455/552.1; 455/41.2; 340/13.26

(58) Field of Classification Search
CPC .... H04B 1/406; H04W 88/06; H04W 88/027; G08C 19/14
USPC ........ 455/41.2, 41.3, 552.1, 554.2; 340/13.26
See application file for complete search history.

(56) References Cited

U.S. PATENT DOCUMENTS

| 2002/0128019 | A1 | 9/2002 | Ben-Yair et al. | |
| 2007/0018785 | A1* | 1/2007 | Chi | 340/5.2 |
| 2007/0141997 | A1* | 6/2007 | Wulff et al. | 455/78 |

FOREIGN PATENT DOCUMENTS

| EP | 1448008 A1 | 8/2004 |
| EP | 2071876 A1 | 6/2009 |
| WO | 2007047677 A2 | 4/2007 |

* cited by examiner

*Primary Examiner* — Nhan Le
(74) *Attorney, Agent, or Firm* — Coats & Bennett, PLLC (57) ABSTRACT

The invention relates to a control node (210) of an indoor cellular network allowing to identify a location of a mobile user and allowing to monitor the antennas present in the indoor system. To this end the control node comprises a receiver (217) receiving a measurement list (50) from the mobile device (100) connected to at least one antenna of said indoor cellular network, the measurement list (50) containing at least one antenna identification signal and the corresponding signal strength with which said at least one antenna identification signal from said at least one antenna (230) is received by said mobile device (100). Using an antenna location database (211) containing the antennas and the corresponding antenna locations of said indoor cellular network, the control node is able to determine the location of the mobile device.

6 Claims, 12 Drawing Sheets

| Tag | Antenna | Location inside the building | Status of each components |
|---|---|---|---|
| 1 | 1 | located in corridor Level 1 | No Alarm |
| 2 | 2 | located in room 11 | No Alarm |
| 3 | 3 | located in Meeting room 10 | Low Alarm |
| 4 | 4 | located in room 17 | No Alarm |
| 5 | 5 | located in room 19 | No Alarm |
| . | . | . | . |
| . | . | . |  |
| . | . | . | . |
| 98 | 98 | located in Fitness room 489 | Medium Alarm |
| 99 | 99 | located in corridor Level 55 | No Alarm |
| . | . | . |  |
| . | . | . |  |
| . | . | . |  |
| 300 | 300 | located in Meeting room 1256 | Major Alarm |

| IMSI | Tag | Antenna | RFID/Antenna Location |
|---|---|---|---|
| 12845360 | 1 | 1 | located in corridor Level 1 |
| 12589673 | 2 | 2 | located in room 11 |
| 52658746 | 3 | 3 | located in Meeting room 10 |
| 42558149 | 4 | 4 | located in room 17 |
| 12596483 | 5 | 5 | located in room 19 |
| . | . | . | . |
| . | . | . | . |
| . | . | . | . |
| 25968743 | 98 | 98 | located in Fitness room 489 |
| 36598745 | 99 | 99 | located in corridor Level 55 |
| . | . | . | . |
| . | . | . | . |
| . | . | . | . |
| 36999865 | 300 | 300 | located in meeting room 1256 |

| UE Identification Number (IMSI/TMSI) | UE Position inside the building |
|---|---|
| 666666666 | Is now in Level 22 near the elevator |
| 111111111 | Is now in Level 12 in corridor 22 left side |
| 999999999 | Is now in Level 53 in the restaurant right side |
| 444444444 | Is now in Level 36 in room 335 |
| 777777777 | Is now in Level 6 in the lobby left side |
| . | . |
| . | . |
| . | . |
| 888888888 | Is now in Level 26 in the lobby |
| 1212121212 | Is now in Level 44 in room 445 |
| . | . |
| . | . |
| . | . |
| 85697425236 | located in meeting room 1256 |

FIG. 12

INDOOR CELLULAR NETWORK WITH POSITION INFORMATION OF A MOBILE DEVICE

TECHNICAL FIELD

The present invention relates to a control node of an indoor cellular network, to a method for operating the control node, to a mobile device that is connected to said indoor cellular network, to an indoor antenna of the cellular network and an operation and maintenance unit of the indoor cellular network.

BACKGROUND

SON is an abbreviation for Self-Organizing Network. The idea behind SON is to minimize the load for the operator of the network by dynamically adding functions, such as self-configuration, self-optimization and self-healing. A SON function may refer to an autonomous activity which is a process which is fully controlled by a machine without requiring human interaction. Furthermore, a SON function may refer to an automatic activity that is a process where a significant part of the action is handled by a machine, but where some human interaction is required, e.g. where an operator is required to activate machine specific macros or required to verify results.

There is a trend to add these functions in network elements, e.g. RBS (Radio Base Station). In current networks there is a lack of SON functions related to inventory management. In particular, there is no autonomous way allowing self-inventory management of indoor antennas.

A further aspect of indoor cellular networks is the need to determine the exact position of a mobile device used in the indoor cellular network. By way of example, in case of an emergency call of a mobile device used in an indoor cellular network, the exact position of the mobile device is needed. With current location methods it is not possible to exactly determine the position or location of a user with a mobile device. The precision of the methods known in the art are not enough to determine the exact position of a mobile device. By way of example, it is possible to roughly determine the position of a mobile device using the cell ID. However, the cell ID is not suited for indoor use and has a precision of about 200 to 500 meters. When taking into account the angle of arrival of the signals from the mobile device, the position of a mobile device can also be determined. However, the precision with 100 to 500 meters is not enough and the angle of arrival method is not suited for indoor use. Another possibility for locating a mobile device is the RTT (Round Trip Time) location method. Both the cell ID and the distance from the base station are used to calculate the position of the mobile device. As in the above discussed methods the precision of this method with 150 to 400 m is not high enough and it is not suited for indoor use. The use of the uplink U-TDOA (Time Difference of Arrival) has a precision of less than 50 meters and may be used indoors. However, the precision is not high enough for an exact location determination. The use of satellite based position methods, such as GPS, provides the required precision, however, the GPS signals can normally not be received indoors.

SUMMARY

Accordingly, a need exists to provide a possibility to precisely determine the position of a mobile device within an indoor cellular network.

This need is met by the features of the independent claims. Preferred embodiments of the invention are described in the dependent claims.

According to a first aspect of the invention a control node of an indoor cellular network is provided comprising a receiver receiving a measurement list from a mobile device, the mobile device being connected to at least one antenna of said indoor cellular network. The measurement list contains at least one antenna identification signal and the corresponding signal strength with which said at least one antenna identification signal from said at least one antenna is received by the mobile device. The control node furthermore contains an antenna location database in which the antennas and the corresponding antenna locations of said indoor cellular network are provided. The control node furthermore comprises a location determining unit that determines the location of said mobile device based on the received measurement list and based on the antenna location database. With the use of the antenna location database in which the corresponding antenna locations of the indoor cellular network are provided and with the use of the measurement list in which the antenna identification signals are provided with the corresponding signal strengths, it is possible to exactly determine the location of a mobile device used in an indoor cellular network. Especially in case of an emergency call by a user of a mobile device used in an indoor cellular network, a fast and precise determination of the location of the mobile device is possible.

According to one embodiment of the invention, the location determining unit determines the location of the mobile device by identifying in the measurement list received from the mobile device the antenna having the highest signal strength among the antenna identification signals contained in the list and by determining the position of the antenna with the highest signal strength using the antenna location database. When a mobile device receives antenna identification signals from different antennas, the mobile device will be located next to the antenna from which the highest signal strength is received. Depending on the location of the indoor antennas the localization inside a building is improved and will range between 1 meter and 10 meters.

Preferably, the control node comprises an antenna location database updating unit that is configured to determine when a new antenna was added to the indoor cellular system and that is configured to incorporate said new antenna with its location into the antenna location database. The incorporation of the new antenna with its location into the antenna location database can either be carried out by a user of the control node, or the location may be automatically incorporated into the antenna location database when it is clear from a measurement list received where the antenna is located in the indoor cellular network.

When a new antenna identification signal is detected in a measurement list that is not contained in said antenna location database an alarm issuer may be provided configured to issue an alarm signal. The alarm signal can be output to a user of the control node, the user being informed that a new antenna is present in the indoor cellular network. The user can then manually incorporate the new antenna into the antenna identification signal. In another embodiment the alarm issuer issues an alarm signal if it is detected that an antenna identification signal for one of the antennas contained in said antenna location database is not detected within a predetermined time interval in any of the measurement lists received by the control node. If an antenna identification signal from one antenna is not received over a longer period of time, it might be deduced, that the antenna is not working anymore. In such a situation the alarm issuer may issue an alarm signal informing the user that a problem with the antenna for which no antenna identification signal is received, may exist. Thus, it is possible to monitor the antenna status of each antenna allowing to improve the inventory management of indoor antennas. The detection of new antennas or the detection that antenna identification signals are missing help to improve the inventory management of the indoor cellular network.

For detecting the measurement list the control node may contain a measurement list detecting unit connected to an uplink data stream from the mobile device to the control node. The measurement list detecting unit can retrieve the measurement list from the uplink data stream. Preferably, the measurement list detecting unit is connected to layer 2, layer 3 and/or layer 1 of the uplink data stream to the control node. The measurement list detecting unit can further monitor the RRC (Radio Resource Control), RLC (Radio Link Control), MAC (Multiple Access Control) and the transport layer of the uplink data stream. The measurement list is embedded in the uplink data stream in the layers mentioned above and can be detected by the control node using the measurement list detecting unit.

The invention furthermore relates to a method for operating the control node of the indoor cellular network as mentioned above in which the measurement list is received and the location of the mobile device is determined using the received measurement list and using the antenna location database.

By determining the antenna having the highest signal strength among the antenna identification signals, and by determining the position by said antenna using the antenna location database, the exact position of the mobile device can be determined easily and in an effective way.

When the location of a mobile device within the indoor cellular network is determined, mobile device identification data may be included into the antenna location database. By way of example, the IMSI (International Mobile Subscriber Identity) can be written into the antenna location database linked to the antenna where the mobile device was detected.

One possibility to provide antenna identification signals that are received by the mobile device is the use of the RFID technology using RFID tags connected to antennas. An RFID tag is a small transponder responding to queries from an RFID reader by wirelessly transmitting an unique identifier. Instead of the RFID technology any other short range wireless transmission technology may be used. By way of example, an additional possibility to transmit antenna identification signals is the use of Bluetooth.

According to another aspect of the invention an antenna of an indoor cellular network is provided comprising an identification signal emitter that is configured so as to emit an antenna identification signal allowing to identify the emitting antenna when a trigger signal from a mobile device is received. When the RFID technology is used the identification signal emitter is an RFID tag, preferably an active RFID tag that is coupled to the antenna. The active RFID tag then responds to the signal emitted by the mobile device and transmits the antenna identification signal.

According to one embodiment, the antenna comprises a reflector, the identification signal emitter being arranged on said reflector. The reflector that is used to reflect the emitted antenna signals may be used in this embodiment to better reflect the emitted antenna identification signal so that it can be detected by the mobile device. In the case of the RFID technology a trigger signal is emitted from the mobile device, the trigger signal triggering the emission of the antenna identification signal. However, when other short range wireless transmission technologies are used, a trigger signal need not necessarily be emitted by the mobile device. It is also possible that the identification signal emitter coupled to the antenna continuously or periodically emits the antenna identification signal that can be received by mobile devices moving inside the indoor cellular network.

The invention furthermore relates to a mobile device configured to be connected to said indoor cellular network, the mobile device comprising a receiver receiving said at least one antenna identification signal from at least one antenna of said indoor cellular network. The mobile device furthermore comprises a list generating unit generating the measurement list containing said at least one received antenna identification signal and the corresponding signal strength with which said at least one antenna identification signal is received from the antenna by the mobile device. The mobile device furthermore comprises a transmitter transmitting said measurement list to the control node of the indoor cellular network. The measurement list generated by the mobile device including the antenna identification signals and the corresponding signal strengths are then used by the control node for determining the location of the mobile device as described above.

If the RFID technology is used, the receiver of the mobile device comprises an RFID reader configured to read the signal from the RFID tag coupled to the antenna of the indoor cellular network. Furthermore, the mobile device is configured to emit the RFID signal by which the antenna RFID tag is triggered to emit the antenna identification signal. If the Bluetooth technology is used, a Bluetooth transmitter is connected to the antenna and a Bluetooth receiver is provided in the mobile device.

The invention furthermore provides a method for operating the mobile device in which said at least one identification signal is received, the measurement list detailed above is generated and included into an uplink data stream from the mobile device to a control node of the indoor cellular network.

Preferably, the measurement list is generated by including into the measurement list all antenna identification signals that are received by the mobile device and by including the corresponding signal strengths with which the antenna identification signals are received from different antennas, respectively and by arranging the antenna identification signals according to signal strength. When such a ranking of the antenna identification signals is carried out in the a mobile device, the control node only needs to determine the antenna identification signal of a predetermined position within the ranking for determining the antenna, the position of which corresponds to the position of the mobile device within a predetermined range, such as 10 to 15 meters.

Preferably, the antenna identification signals are periodically queried by the mobile device and then included into the uplink data stream, the control node being able to update the position of the mobile device each time a new position of a mobile device is detected.

Preferably, the measurement list is included into a DCCH or DTCH logical data channel or a physical control PUCCH of the uplink data stream.

The invention furthermore relates to an operation and maintenance unit of the indoor cellular network containing a location monitoring interface that is configured to identify location information of the mobile device connected to said indoor cellular network. Preferably, the location monitoring interface receives the location information directly from the location determining unit.

BRIEF DESCRIPTION OF THE DRAWINGS

The invention will be discussed in further detail below with reference to the accompanying drawings, in which.

DETAILED DESCRIPTION OF THE DRAWINGS

Figure 1:
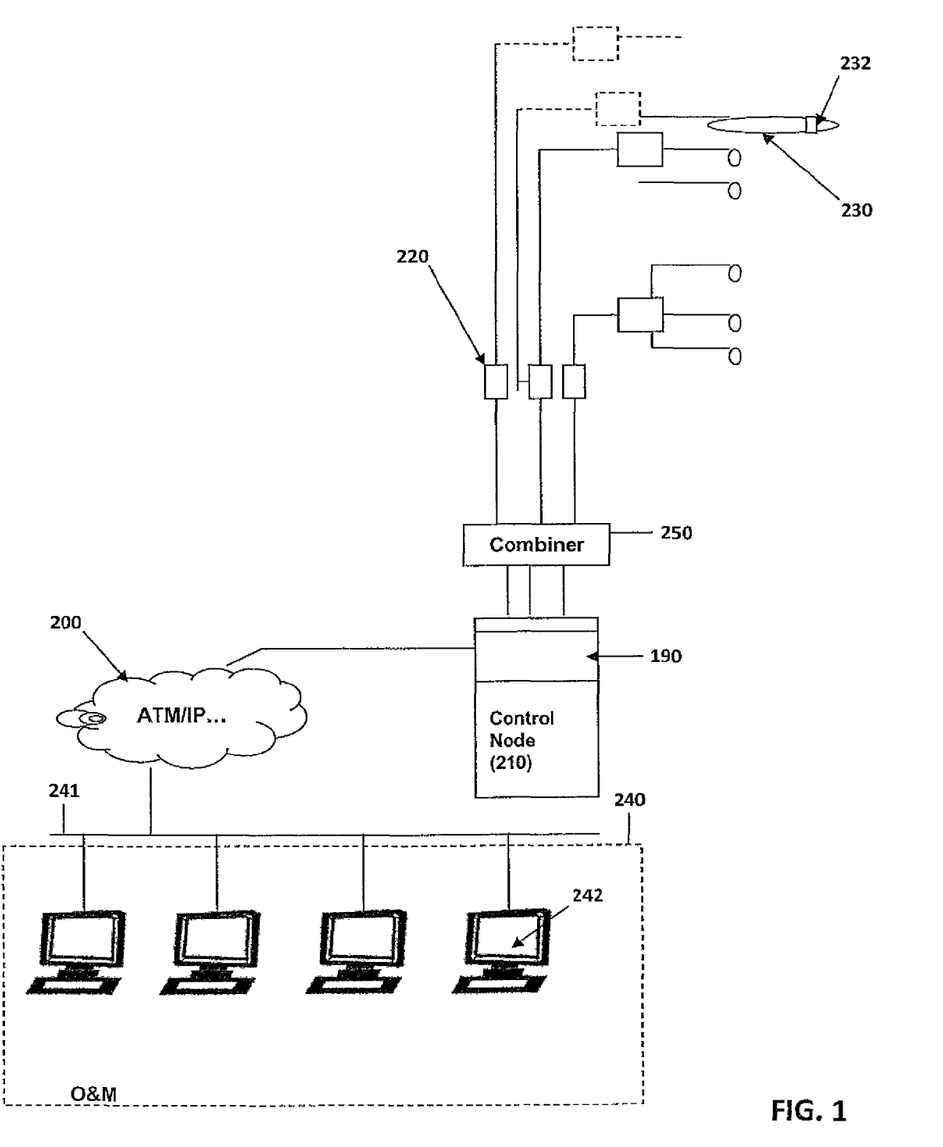
FIG. 1 is a schematic view of an indoor cellular network.

In FIG. 1 a schematic view of an indoor cellular network is shown. Especially the distributed antenna system 200 inside a building is schematically shown comprising a control node 210 of the indoor cellular network, such as a NodeB or e-NodeB. From the NodeB 210 the signals are transmitted via a combiner 250 and splitters 220 to antennas 230 that are distributed over a building. By way of example, the NodeB may be provided in the basement level, whereas the different antennas 230 may be provided in other floors or levels of the building. In the embodiment shown only a few antennas and splitters are shown. However, it should be understood that the distributed antenna system may contain much more antennas on different floors than shown in FIG. 1.

The control node 210 comprises a location monitoring interface 190 where a location information is received and transmitted to an operation and maintenance unit 240. The operation and maintenance centre 240 comprises a location monitoring interface 241 receiving the location information which can be visualized on monitoring devices 242 using a graphical user interface as will be described in further detail inter alia in connection with FIGS. 5, 11 and 12. The communication between the control node and the operation and maintenance unit 240 can be over ATM (Asynchronous Transfer Mode), IP or other network types. The different antennas 230 contain an RFID tag 232 as will be explained in connection with FIGS. 2 and 3.

Figure 2:
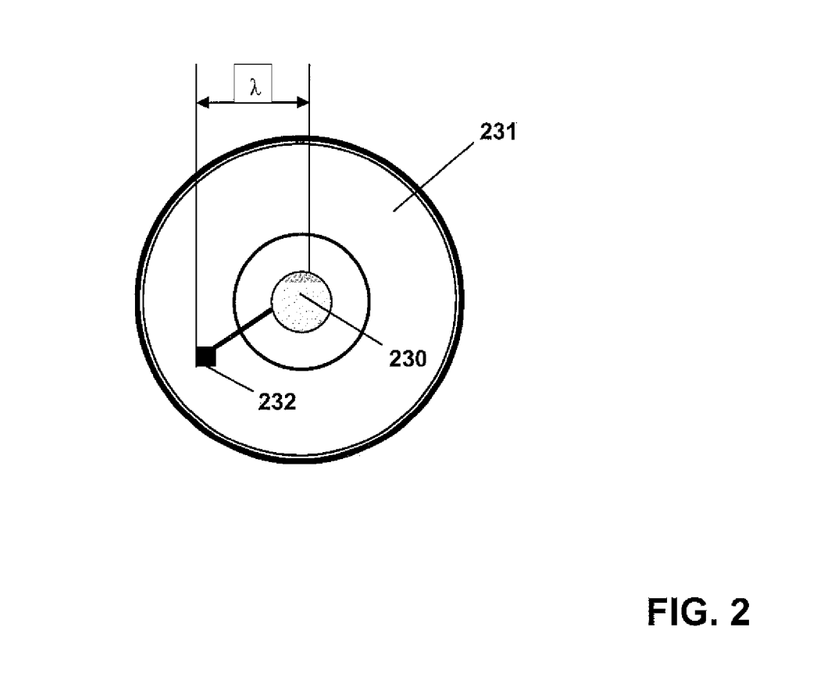
FIG. 2 is a top view of an antenna of an indoor cellular network with an RFID tag.
Figure 3:
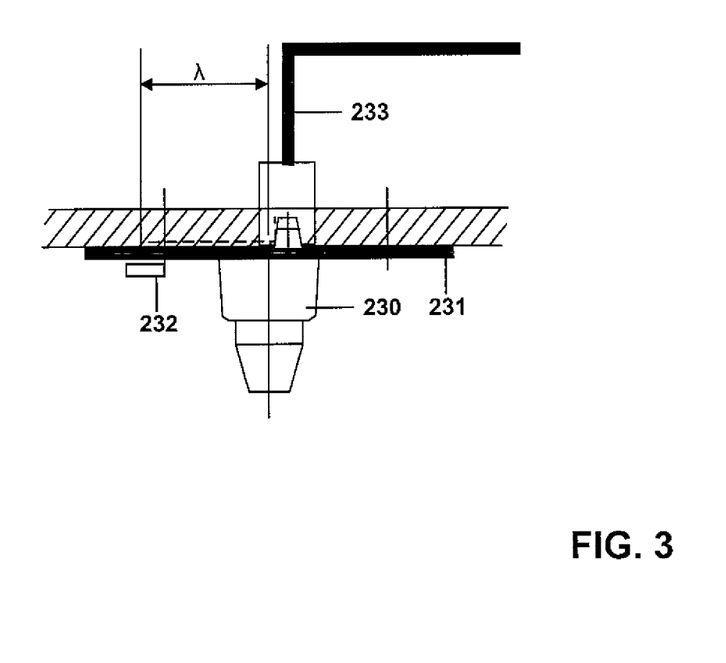
FIG. 3 is a side view of the antenna with the RFID tag of FIG. 2.

In FIGS. 2 and 3 the antennas used in the system of FIG. 1 are shown in more detail. The antennas 230 correspond to antennas that are normally used in indoor cellular networks including a reflector 231 to which an RFID tag 232 is connected. The exact location of the RFID tag on the reflector may depend on the wavelength λ emitted from the antenna. The antenna is normally a λ/4 dipole, the distance between the antenna and the RFID tag lying in the range of the wavelength λ emitted by the antenna. The RFID tag is preferably an active RFID tag meaning that the RFID tag is supplied with power that is needed to emit an antenna identification signal in response to a signal from a mobile device as will be explained in further detail below. RFID tags are widely used for different purposes, such as monitoring of logistic and traffic and archiving of goods. Thus, if the invention is used in connection with an RFID tag, the invention can be incorporated into an indoor cellular network in a cost effective way. Different frequency ranges for RFID tags are known. Each RFID tag 232 emits an antenna identification signal identifying the antenna to which the RFID tag is connected. In other words, each RFID tag emits its own antenna specific identification signal allowing to identify the antenna. For the power supply of the RFID tag the power supply 232 of the antenna can be used as shown in FIG. 3. The distance in which the antenna identification signal should be received may be in the range of 5 to 15 meters or even larger, depending on the frequency range of the RFID tag used and depending on the transmitted signal power. Several frequency ranges for RFID tags are known such as the different frequency ranges between 433-434 MHz, 865-886 MHz, 2446-2454 MHz, 5795-5805 MHz and 5805-5815 MHz. In a preferred embodiment the frequency range between 5795 and 5805 MHz is used allowing a read distance of the signals emitted by the tag being larger than 10 meters.

The frequency range between 5795 and 5805 MHz is a preferred frequency range, as this frequency range is beyond the frequency range as used in GSM, UMTS or LTE. The frequency intersection or disturbances with other RF systems are low and RFID tags used in this frequency range are active tags using an RIR-1012-01 interface. The emission distance of such an RFID tag is sufficient for indoor use, as antennas of an indoor system are normally installed close to each other making it possible for a mobile device to read the surrounding RFID tags easily. The advantage of directly connecting the RFID tag to the antenna can be seen in the fact that the power supply can be taken from the antenna connector where the feeder cable 233 is connected as shown in FIG. 3.

Figure 4:
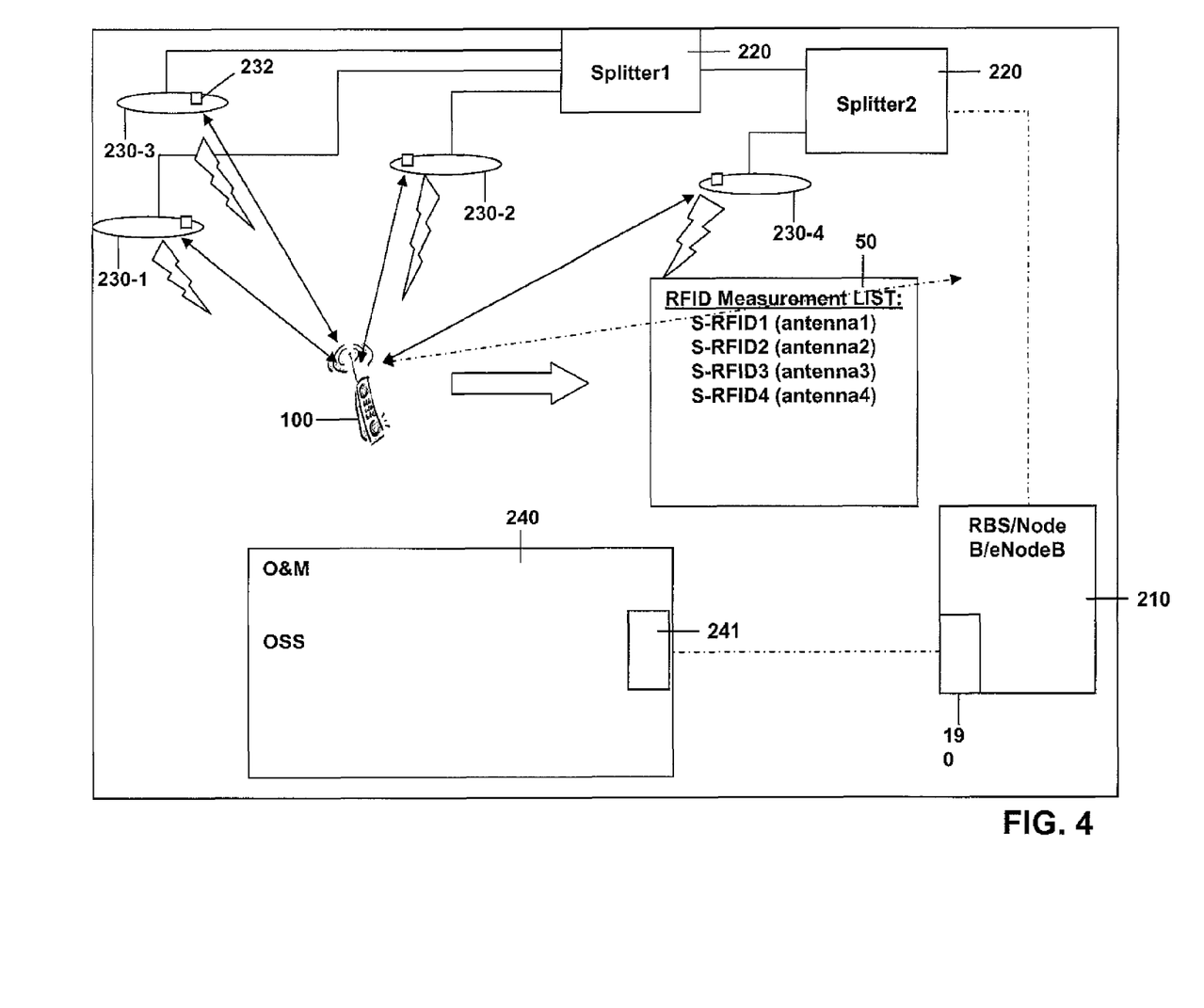
FIG. 4 is a schematic view of a mobile device connected to several antennas, the mobile device transmitting a measurement list to a control node of the indoor cellular network.
Figure 5:
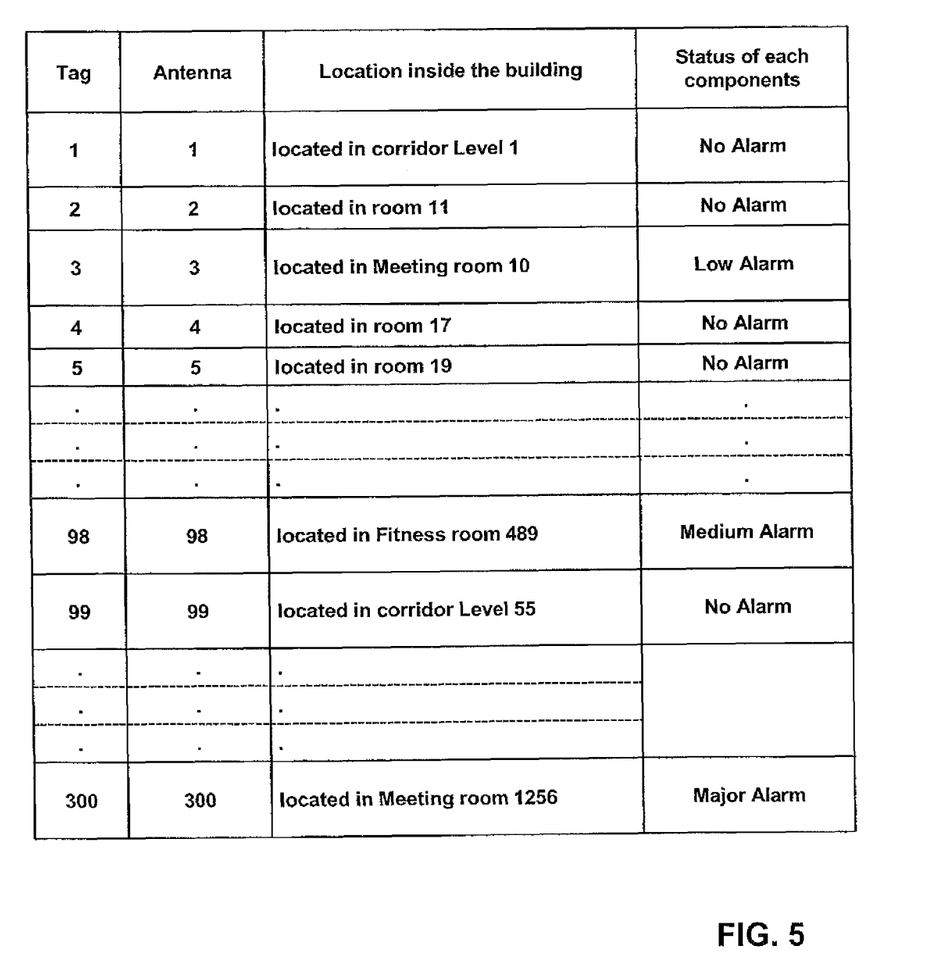
FIG. 5 is a schematic view of an antenna location database contained in the control node of the indoor cellular network.

In FIG. 4 an exemplary embodiment is shown in which a mobile device 100 is connected to several antennas 230 of an indoor cellular system. In the embodiment shown four different antennas 230-1 to 230-4 are provided that are connected via two different splitters 220 to the e-NodeB 210. An RFID tag 232 is connected to each of the antennas. The mobile device periodically measures the surrounding RFID tags implemented in the different antennas. By way of example, the measurement of the surrounding RFID tags can be performed in the time of the CPM (Compressed Mode). The mobile device then creates a measurement list 50 and adds all measured RFID signals to this list and ranks the received RFID signals based on the signal strength of the surrounding RFID signals. In the embodiment shown this means that the signal S-RFID1 from antenna 230-1 is the strongest signal, the signal S-RFID4 from antenna 230-4 being the weakest signal. The mobile device then transmits this ranking in the measurement list 50 to the NodeB/e-NodeB 210 in the uplink bit stream, e.g. in one of the logical data channels, such as DCCH or DTCH or in the physical control PUCCH. The NodeB 210 identifies the physical location of the mobile device by extracting the strongest RFID signal from the measurement list and by means of an antenna location database 211 where the antennas and their corresponding locations are saved. In FIG. 5 such an antenna location database is schematically shown, the database containing an RFID tag identification number with the corresponding antenna to which the tag is coupled and the location of the antenna inside the building.

The e-NodeB 210 processes the received uplink signal bit stream and extracts the measurement list measured by each mobile device. The e-NodeB 210 identifies the location of the mobile device inside the building by combining the antenna location database 211 as shown in FIG. 5 and the measurement list 50 as received from the mobile device. In the example shown in FIG. 4 the signal S-RFID1 is the strongest signal originating from antenna 1. The antenna location database 211 can then be used to determine that the mobile device is probably located near the location of antenna 1 inside the building, in the example given in the neighbourhood of the corridor in level 1.

In the embodiment shown in FIG. 4 the ranking is carried out in the mobile device. In another embodiment, it is also possible that the mobile device simply collects the RFID signals received from the different antennas and transmits these signals to the control node 210 without ranking them. The control node 210 may then contain the logic for determining the strongest RFID signal among the RFID signals received by one mobile device.

The e-NodeB 210 can then transmit the determined location information to an operation and maintenance unit 240, where it is received in a location monitoring interface 241.

Figure 6:
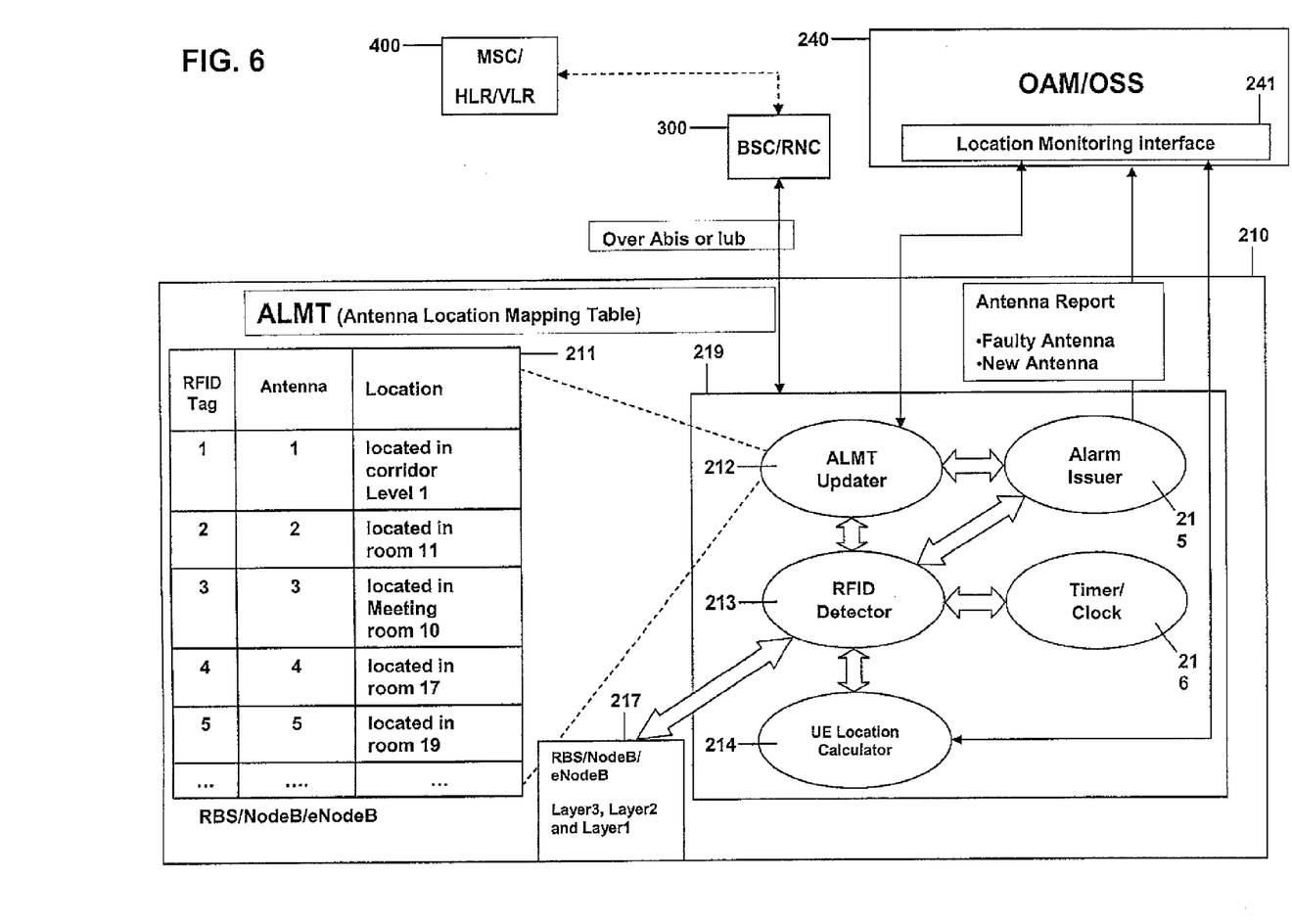
FIG. 6 is a more detailed view of the control node of the indoor cellular network.

In FIG. 6 a more detailed view of the e-NodeB is shown. As already discussed in connection with FIGS. 4 and 5 the e-NodeB comprises the antenna location database 211 that is named antenna location mapping table ALMT in the embodiment of FIG. 6. The e-NodeB contains a receiver 217 where the signals from the mobile devices are received. The receiver 217 is connected to an RFID detector 213 configured to detect the measurement list in the uplink data bit stream. This RFID detector or measurement list detector can be connected to layer 3, layer 2 and layer 1 of the NodeB and the e-NodeB where the uplink bit streams are received, restructured, and reconfigured. The connection may include the RRC, RC, MAC and the connection to the transport layer. The RFID detector 213 detects the RFID measurement list embedded in the uplink data stream in the layers mentioned above.

The RFID detector may furthermore compare the content of the measurement list 50 to the current version of the antenna location database 211. If a new RFID signal which is not part of the existing list saved in the database 211 is detected, an alarm signal may be generated and sent to an alarm issuer 215 from where the alarm signal is transmitted to the operation maintenance unit 240. An administrator of the unit 240 can then manually include the new antenna with its RFID tag in the antenna location database 211. The RFID detector may further issue an alarm to the alarm issuer when it is detected that an existing RFID is detected in none of the lists received by the control node 210 over a longer period of time. By way of example, if it is detected that RFID signals are received from antennas in the neighbourhood and if no signal is received from one of the antennas known to be located in the same neighbourhood, it may be concluded that said one antenna is not working correctly anymore. Thus, the RFID detector helps to monitor the status of each antenna. In the embodiment shown it is possible to detect and monitor faulty antennas. Each antenna equipped with an RFID tag and connected to the distributed antenna system and its status can be monitored by the O&M unit 240 through the e-NodeB. Antennas or Feeders were damage has occurred, are quasi separated from the distributed antenna system due to cut of the current. The RF signal at these components is totally absent resulting in a missing RFID signal from the active RFID tag connected to the antenna. The RFID detector issues an alarm signal, since the RFID signal of this antenna can no more be transmitted and read by the mobile device. As a consequence, the RFID signal cannot be detected by the RFID detector. In an alternative the RFID tag itself may be damaged so that the RFID signal will not be transmitted to the mobile device. This may also lead to overrun of a predetermined time interval set at a timer 216, an alarm signal being issued by the detector 213 towards the alarm issuer 215 and further to the O&M unit 240. In one embodiment it may be possible to use three different kind of alarms, a first low alarm that is generated when an RFID signal is determined at a time interval below a predetermined time interval. A medium alarm level may be generated if the time interval until the last detection is within a predetermined time interval and a high alarm level may be generated if the time interval starting from the last reception of an RFID signal from said antenna exceeds said predetermined time interval.

Figure 11:
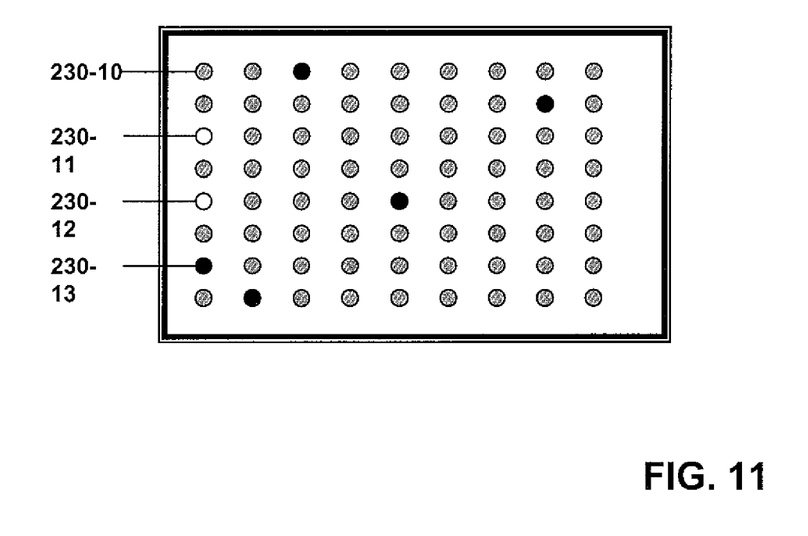
FIG. 11 is a schematic view of a user interface allowing a user to determine an antenna status.

An example of an antenna monitoring system allowing to monitor the functioning of the antenna is shown in FIG. 11. In FIG. 11 a monitoring over view over the different antennas connected to the indoor distributed antenna system is shown. Each circle indicates an antenna. The circles may have different colours, e.g. green, when the component is working well and other colours depending on the alarm level. By way of example, antenna 230-10 indicated in the upper left column may operate well, the operation being indicated by a green light. For antenna 230-11 a low alarm is detected indicating that an RFID signal of this antenna was determined in a time interval below said predetermined time interval. For antenna 230-12 for even longer time no RFID signal of this antenna was received resulting in an alarm signal having a medium level. If no RFID signal for an antenna is received for a time interval exceeding said predetermined time interval, the high alarm level may apply, in the embodiment shown antenna 230-13 that may be shown in red. By way of example, by double clicking on the different circles a more detailed description of the antenna may be displayed, such as the antenna status, an alarm description mentioning that an RFID has not been detected since time x. Additionally, the name of the antenna and the location inside the building may be indicated. The alarm status of the different antennas may also be indicated in the antenna location database 211 as indicated in FIG. 5 in the right column. In addition to the location antennas inside the building and the number of the RFID tag the alarm status may be indicated as shown. The monitor shown in FIG. 11 may be displayed on the monitoring device 242 of the O&M unit shown in FIG. 1.

Referring again to FIG. 6, the control node 210 furthermore comprises a location calculating unit 214 that is used for calculating the physical location of the mobile device with the help of the ranking of the RFID signals inside the measurement list and the content of the antenna location database 211. The location determining unit 214 extracts the location of a mobile device by determining the strongest among the signal identification signals contained in the measurement list and by determining the location of the corresponding antenna using the database 211 and transmits it to a location monitoring interface 241 of the O&M unit 240. Additionally, a database updating unit 212 is provided that is controlling the antenna location database 211. The updating unit 212 is charged to control any changes or updates. The updating unit monitors the status for each RFID tag and generates and forwards the location results to the location monitoring interface 241. The location database updating unit 212 allows the user to update the database 211 manually and remotely from the O&M unit 240 through the new location and monitoring interface 241. The updating unit 212 furthermore contains the last current version of the location database 211. Furthermore, the updating unit may generate alarm signals in case of any faults occurred in the antenna location database 211. The units 212 to 216 may be incorporated into one antenna location database control unit 219 that is connected over the Abis or Iub interface to a base station controller or radio network controller 300 that is connected to a mobile switching centre 400.

The timer/clock 216 counts the time interval when an RFID from an antenna is not detected any more. By way of example, RFID6 existed in the RFID list contained in the antenna location database, the RFID6 is measured by a mobile device every day three times in the average. If RFID6 has not been measured at least once within one day, this will provoke an alarm. This alarm can then be issued via the RFID detector 213 to the alarm issuer 215.

Figure 7:
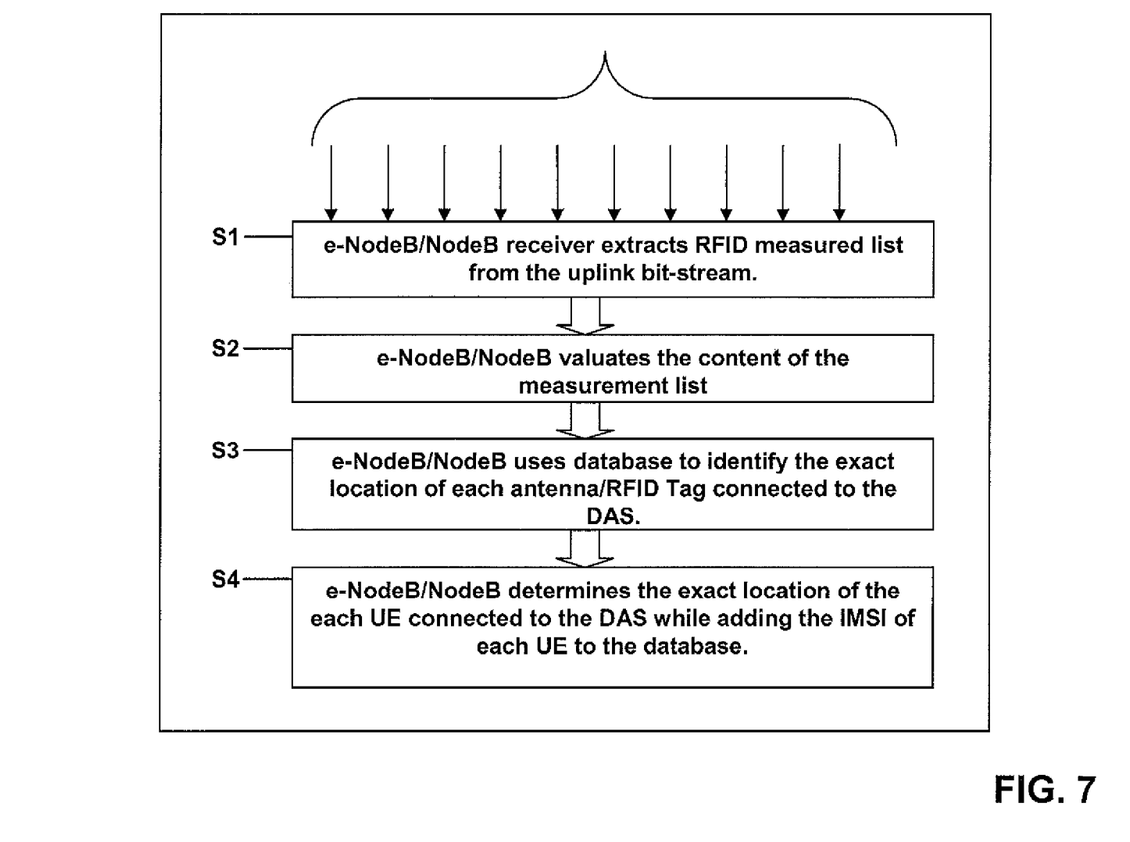
FIG. 7 is a flow-chart showing the different steps for determining the location in the control node shown in FIG. 6.
Figure 8:
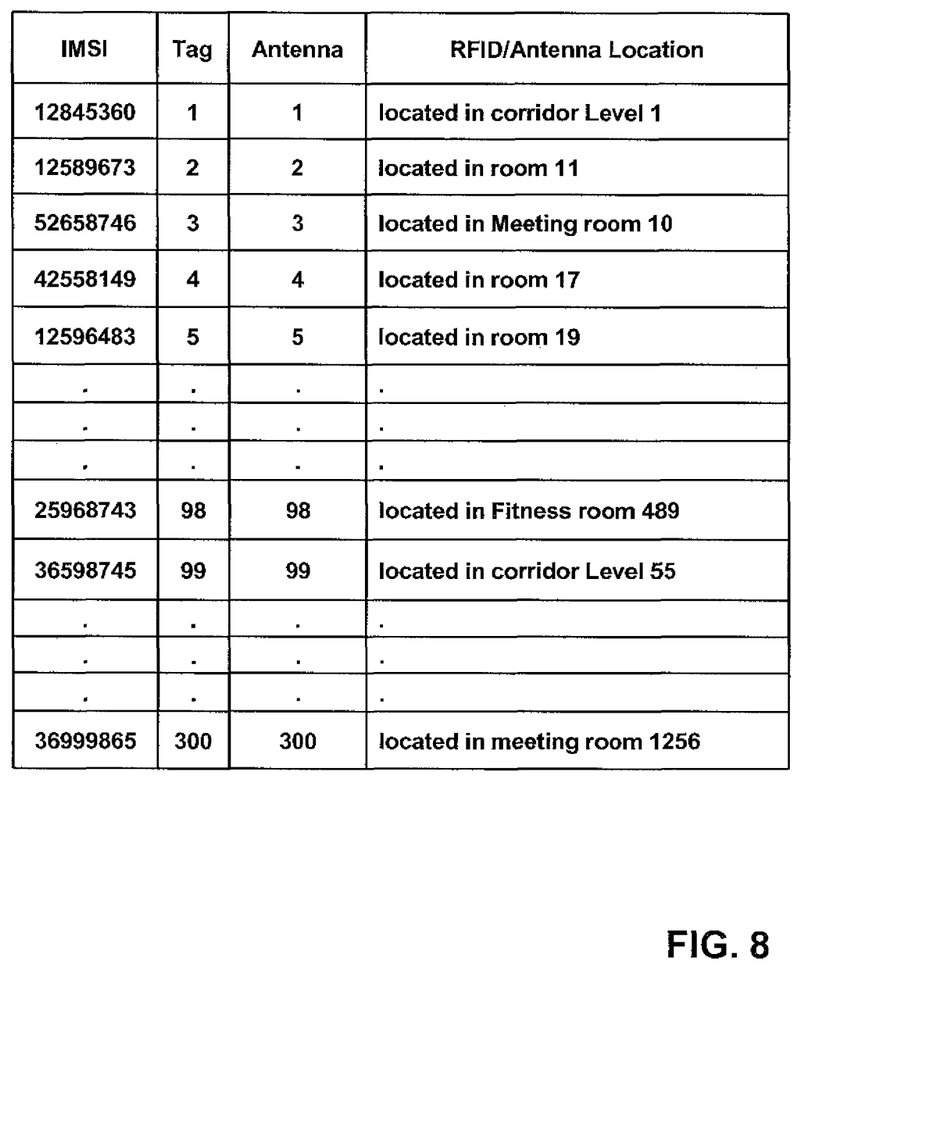
FIG. 8 is a schematic view of an antenna location database including mobile device identification data allowing to directly locate the different mobile devices used in this indoor cellular network.

In FIG. 7 the steps carried out by the e-NodeB are summarized. The different arrows shown in FIG. 7 represent the different uplink signals received from different mobile devices. The e-NodeB receiver 217 receives the signals and the RFID detector extracts the measurement list from the uplink bit stream, respectively (step S1). In step S2 the content of the measurement list is evaluated and in step S3 the antenna location database is used to identify the exact position of a mobile device that is in connection with an RFID tag coupled to one of the antennas of the distributed antenna system. In step S4 the exact location of the mobile device is determined and mobile device identification data, such as the IMSI is incorporated into the antenna location database as shown in the embodiment of FIG. 8. As can be deduced from FIG. 8 the e-NodeB always knows which mobile device is located in the neighbourhood of which antenna. The table shown in FIG. 8 is readily updated and if a mobile device moves from one location to the other, the IMSI is updated accordingly.

Figure 12:
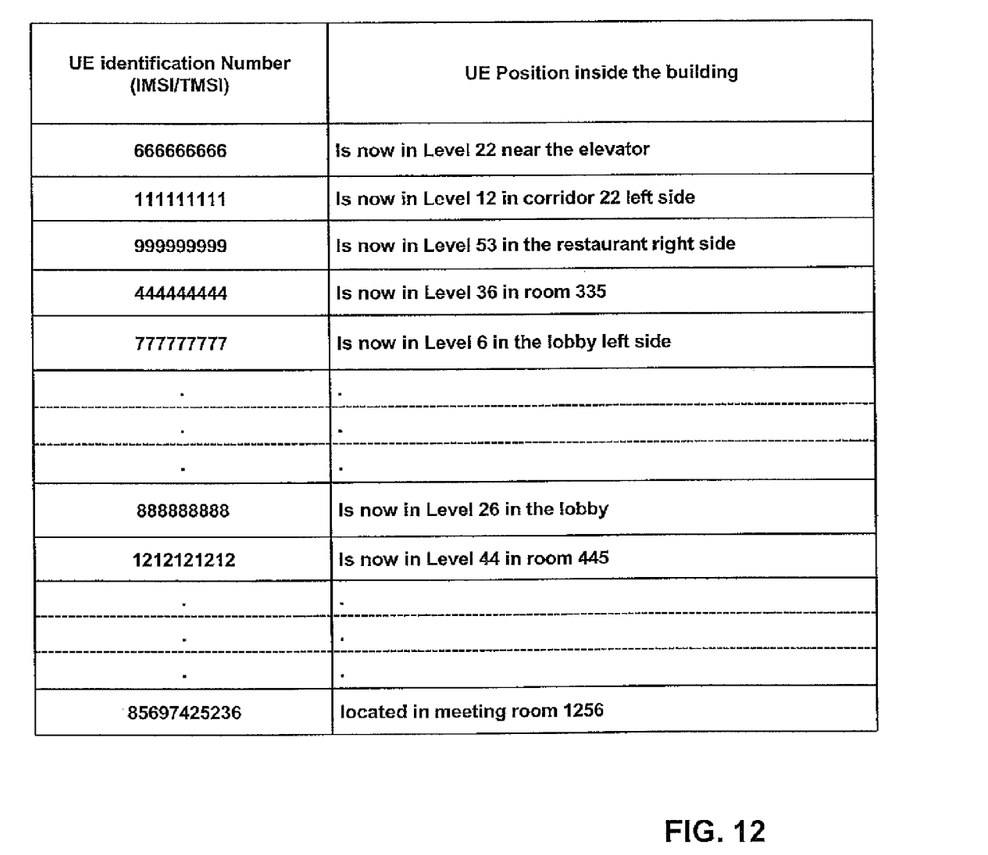
FIG. 12 shows a tracking list of a mobile devices as it can be generated with the present invention.

In FIG. 12 another user tracking list that can be generated by the control node or the O&M unit is shown. In this tracking list the identification number of the mobile device and the corresponding position are indicated. The list in FIG. 12 may be retrieved from the first and the last column of the table shown in FIG. 8. Such track list as shown in FIG. 12 may be handled secretly and handled according to local law. It is possible that the tracking list can only be shown for dedicated purposes, such as emergency situations or other needs, such as criminal circumstances where the law allows to localize a mobile user if needed. Additionally, it is possible that only a certain group of users can have access to this tracking list. This tracking list may be provided in the O&M unit 240.

Figure 9:
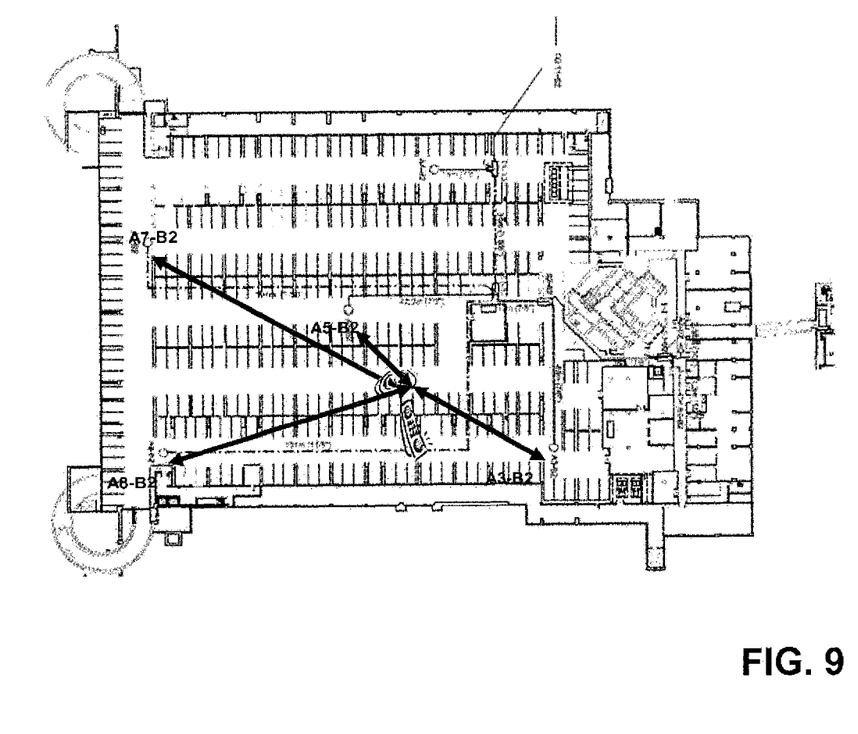
FIG. 9 is a schematic view of a mobile device used inside a building and how the position of the mobile device is determined.

In FIG. 9 another embodiment is shown in which a mobile device 100 measures the RFID tags of the antennas A5-B2, A3-B2, A6-B2 and A7-B2. All these antennas are within the maximum read distance of the RFID tags. The mobile device creates the measurement list and ranks in the list all the measured RFID signals according to their signal strengths. The mobile device then sends the measurement list to the e-NodeB as discussed above where the measurement list is extracted from the uplink signal stream and the signal strength of each RFID signal is evaluated providing an antenna location as discussed above. In the embodiment shown the e-NodeB determines that the mobile device is placed near the antennas A5-B2 and A3-B2 based on the received measurement list.

Figure 10:
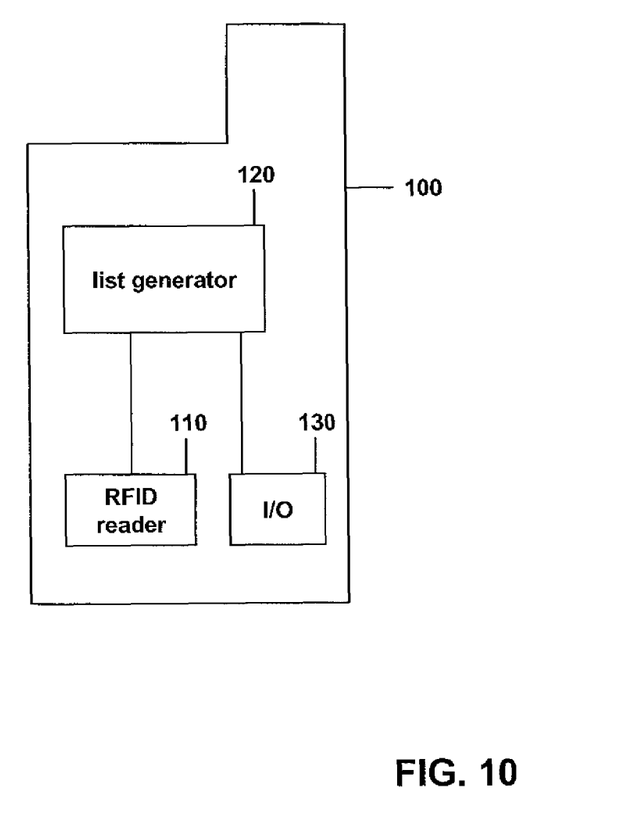
FIG. 10 is a schematic view of a mobile device generating a measurement list that is sent to the control node of the indoor cellular network.

In FIG. 10 a mobile device 100 is shown, the mobile device containing an RFID reader 110 for reading the RFID signals emitted from the different RFID tags. Furthermore, a list generating unit 120 may be provided in the mobile device if the ranking of the antenna identification signals is carried out in the mobile device. If the ranking is not carried out in the mobile device, but in the NodeB, then the list generating unit may be provided in the NodeB. The list, either in the order of signal strength or without a ranking is then transmitted using transmitter 130 to the e-NodeB.

The components shown in FIGS. 6 to 10 or any other units shown in the Figs. may be incorporated as hardware or software or as a combination of hardware and software. As discussed above the RFID tags are preferably long range tags in the frequency range from 5795 MHz to 5805 MHz as in this frequency range little intersection with other technologies, such as GSM, CDMA or LTE is expected. Furthermore, the read distance in this frequency range is above 10 meters, what is enough for indoor use. However, it should be understood that any other frequency range might be used. Preferably, the mobile device inside a building has more RF connections to antennas, preferably line of sight, to receive and send more signal streams simultaneously. This will lead to add more antennas to existing indoor networks. If more antennas are used RFID tags with lower read distances may be used. Furthermore, the RFID technology may also be replaced by other near field communication technologies such as Bluetooth.

The invention claimed is:

1. A method for operating a mobile device connected to an indoor cellular network, the method comprising:
   receiving, by an RFID reader of the mobile device, at least one antenna identification signal from an RFID tag coupled to at least one antenna of the indoor cellular network;
   generating a measurement list containing at least one antenna identification signal and the corresponding signal strength with which the at least one antenna identification signal from the at least one antenna is received by the mobile device;
   including the measurement list in an uplink data stream from the mobile device to a control node of the indoor cellular network;
   the mobile device:
      querying antenna identification signals from the at least one antenna periodically and updating the measurement list accordingly;
      including the updated measurement list in the uplink data stream.

2. A method for operating a mobile device connected to an indoor cellular network, the method comprising:
   receiving, by an RFID reader of the mobile device, at least one antenna identification signal from an RFID tag coupled to at least one antenna of the indoor cellular network;
   generating a measurement list containing at least one antenna identification signal and the corresponding signal strength with which the at least one antenna identification signal from the at least one antenna is received by the mobile device;
   including the measurement list in an uplink data stream from the mobile device to a control node of the indoor cellular network;
   wherein including the measurement list in an uplink data stream comprises including the measurement list in one of a Digital Control Channel (DCCH), a Dedicated Traffic Channel (DTCH) logical data channel, and a Physical control Physical Uplink Control Channel (PUCCH) of the uplink data stream.

3. A method for operating a mobile device connected to an indoor cellular network, the method comprising:
   receiving, by an RFID reader of the mobile device, at least one antenna identification signal from an RFID tag coupled to at least one antenna of the indoor cellular network;

generating a measurement list containing at least one antenna identification signal and the corresponding signal strength with which the at least one antenna identification signal from the at least one antenna is received by the mobile device;

including the measurement list in an uplink data stream from the mobile device to a control node of the indoor cellular network;

wherein the generating the measurement list comprises:
including, in the measurement list, all antenna identification signals received by the mobile device and the corresponding signal strengths with which antenna identification signals from different antennas are received by the mobile device;
arranging the antenna identification signals according to signal strength.

4. The method of claim 3 wherein including the measurement list in an uplink data stream comprises including the measurement list in one of a Digital Control Channel (DCCH), a Dedicated Traffic Channel (DTCH) logical data channel, and a Physical control Physical Uplink Control Channel (PUCCH) of the uplink data stream.

5. The method of claim 3 further comprising the mobile device:
querying antenna identification signals from the at least one antenna periodically and updating the measurement list accordingly;
including the updated measurement list in the uplink data stream.

6. The method of claim 5 wherein including the measurement list in an uplink data stream comprises including the measurement list in one of a Digital Control Channel (DCCH), a Dedicated Traffic Channel (DTCH) logical data channel, and a Physical control Physical Uplink Control Channel (PUCCH) of the uplink data stream.

* * * * *